US008440284B2

(12) United States Patent
Kelly (10) Patent No.: US 8,440,284 B2
(45) Date of Patent: May 14, 2013

(54) REINFORCED LAP IN AN INSEAM MECHANICALLY ATTACHED ROOFING MEMBRANE, METHODS FOR MAKING THE SAME, AND METHOD FOR INSTALLING THE SAME

(76) Inventor: Thomas L. Kelly, Waterbury, CT (US)

( * ) Notice: Subject to any disclaimer, the term of this patent is extended or adjusted under 35 U.S.C. 154(b) by 855 days.

(21) Appl. No.: 10/889,998

(22) Filed: Jul. 13, 2004

(65) Prior Publication Data

US 2006/0013992 A1    Jan. 19, 2006

(51) Int. Cl.
*B32B 3/04* (2006.01)

(52) U.S. Cl.
USPC ............... 428/121; 52/53; 52/408; 52/536; 52/556; 52/559; 428/98; 428/157; 428/174; 428/176; 428/179

(58) Field of Classification Search ........... 428/121, 428/157, 174, 176, 179, 98; 52/536, 556, 52/408, 559, 53
See application file for complete search history.

(56) References Cited

U.S. PATENT DOCUMENTS

| | | | | |
|---|---|---|---|---|
| 1,582,266 A | * | 4/1926 | Harshberger | 52/472 |
| 1,763,601 A | * | 6/1930 | Kirschbraun | 52/560 |
| 2,602,408 A | * | 7/1952 | Smith-Johannsen | 52/394 |
| 2,705,209 A | * | 3/1955 | Rowe | 428/40.3 |
| 3,402,095 A | * | 9/1968 | Varfeldt et al. | 428/142 |
| 4,322,928 A | * | 4/1982 | Freiborg | 52/521 |
| 4,389,826 A | * | 6/1983 | Kelly | 52/410 |
| 4,493,175 A | * | 1/1985 | Coppola, Jr. | 52/410 |
| 4,870,796 A | * | 10/1989 | Hart et al. | 52/409 |
| 6,006,482 A | * | 12/1999 | Kelly | 52/409 |
| 6,673,193 B1 | * | 1/2004 | Bertram | 156/315 |
| 6,689,449 B2 | * | 2/2004 | Hasan et al. | 428/124 |

* cited by examiner

Primary Examiner — Brent O'Hern
(74) Attorney, Agent, or Firm — Cantor Colburn LLP (57) ABSTRACT

Disclosed herein is an improvement for an inseam mechanically attached roofing membrane which includes a body portion, a mechanically fastened edge on one length with a fold line along the body portion and an overlap portion overlying the body portion. Further disclosed herein is a roofing material for a lap type roof system with a reinforced lap edge, which includes the base portion of the roofing material and a secondary portion of material disposed at the edge of the base portion.

15 Claims, 7 Drawing Sheets

REINFORCED LAP IN AN INSEAM MECHANICALLY ATTACHED ROOFING MEMBRANE, METHODS FOR MAKING THE SAME, AND METHOD FOR INSTALLING THE SAME

BACKGROUND

A common method for installing membrane type roofing systems on low sloping roofs employs a lapped configuration of membrane sheets. The portion of each sheet that extends under the next successive sheet is called the "lap edge". The lap edge is used for securement of the sheet to underlying roof materials such as cover board, etc. typically using mechanical means such as screws and washers to secure the lap edge through the underlying materials into the structural roof deck.

The next successive membrane sheet is then attached to the now secured sheet in a manner that over laps the mechanical fasteners. In many cases the attachment of the overlying sheet will be by welding to the underlying sheet to create a water tight seal between each overlapping sheet of membrane.

While the art recognized method performs well for many conditions, there are wind uplift and other conditions that can cause this type of roof to fail by pulling the mechanical attachments through the material of the lap edge.

There have been attempts to improve this type of system in the past such as reducing the distance between fasteners, using termination bar and welding the roofing material on both sides of the mechanical fasteners. None of these improvements are favored however.

With respect to reducing the distance between fasteners, although it is true that the fasteners are less likely to pull through the membrane, the multiplicity of holes tends to cause a perforated tear-line effect such that the membrane edge is torn away from the membrane body. With respect to termination bar, the product is improved but it does still suffer from the fasteners tearing through the membrane in the shear direction of the membrane. With respect to welding on both sides of the fastener, the finished product works well but getting there is labor intensive and difficult.

Therefore, there still exists a need for improvement in the lap-style roofing assemblies and methods for such assembly.

SUMMARY

Disclosed herein is a roofing material for a lap type roof installation which includes a body portion, a fold line along the body portion, and an overlap portion overlying the body portion.

Further disclosed herein is a roofing material for a lap type roof system with a reinforced lap edge, which includes the base portion of the roofing material and a secondary portion of material disposed at the edge of the base portion.

BRIEF DESCRIPTION OF THE DRAWINGS

Referring now to the drawings wherein like elements are numbered alike in the several Figures.

DETAILED DESCRIPTION

Figure 1:
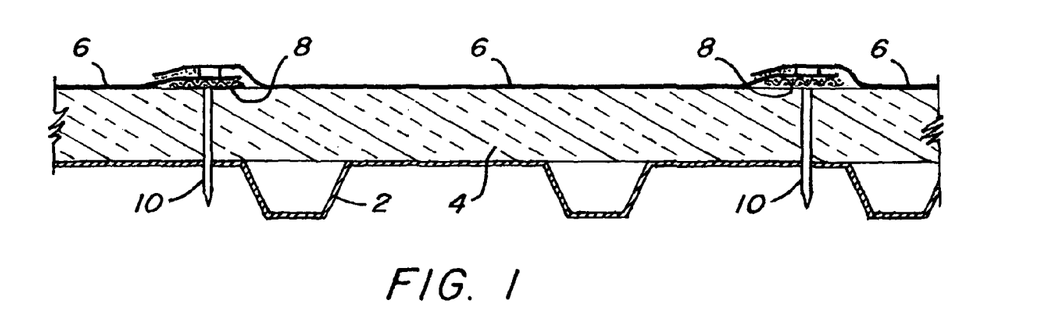
FIG. 1 is a schematic overview of an inseam mechanically attached roof system with a reinforced lap edge.
Figure 2:
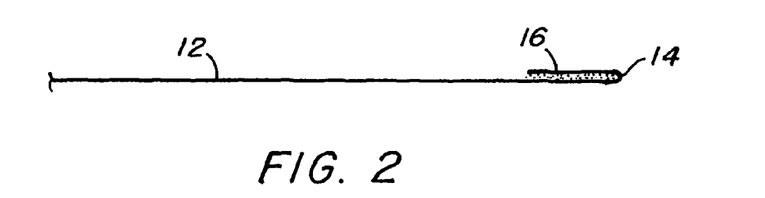
FIG. 2 is the first embodiment of a reinforced lap membrane.
Figure 3:
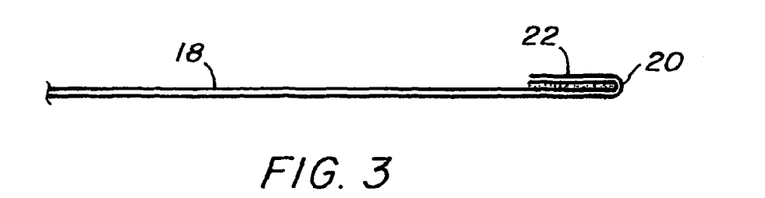
FIG. 3 is the second embodiment of a reinforced lap membrane.

One of ordinary skill in the art will recognize that lap type roof structures may use anything from single ply membrane to multiple plies having reinforcement material therein. Each of these types of materials is subject to the tear through of fasteners as discussed in the background portion of this application. Improving the strength of the material at the fastening location can be done in a number of ways with varying degrees of strength added. To improve understanding of the reader, FIG. 1 is a schematic overview of a roof section utilizing the lap type roof structure. Broadly stated, the figure depicts a roof deck 2, insulation 4, membrane 6, reinforcement 8 and fasteners 10. A number of schematic drawing figures are provided herein and discussed hereunder to provide an understanding to one of ordinary skill in the art of the various ways in which the lap edge may be strengthened in accordance with the teachings herein. Referring to FIG. 2, a single ply membrane 12 may be strengthened by folding an edge intended to act as the mechanically fastened lap edge back upon itself at fold line 14 creating overlap 16. This overlap may be adhered to itself in a number of ways including welding by heat or chemical composition, stuck via an adhesive composition, via stitching, etc. FIG. 3 is very similar to that of FIG. 2 although an additional ply is a part of the membrane. Therefore, the material has been identified with different numerals (material 18, fold line 20, an overlap section 22). One of ordinary skill in the art will understand the similar concept of that of FIG. 2.

Figure 4:
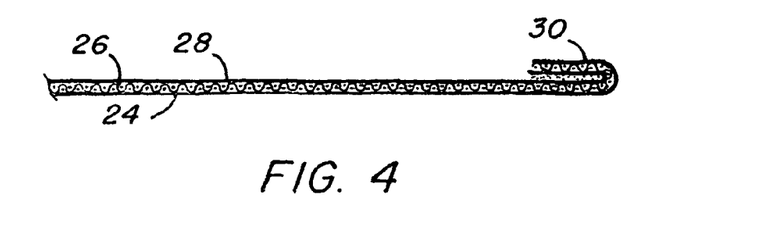
FIG. 4 is the third embodiment of a reinforced lap membrane.
Figure 5A:
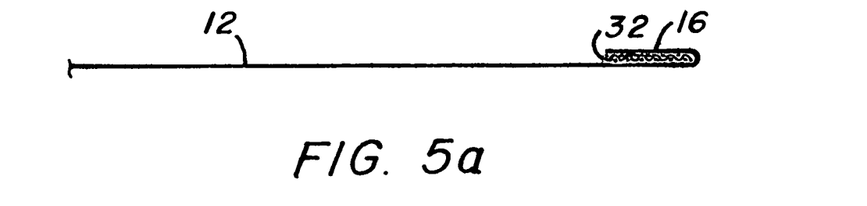
FIG. 5a-c are three sub-embodiments of the fourth embodiment of a reinforce lap membrane.
Figure 5B:
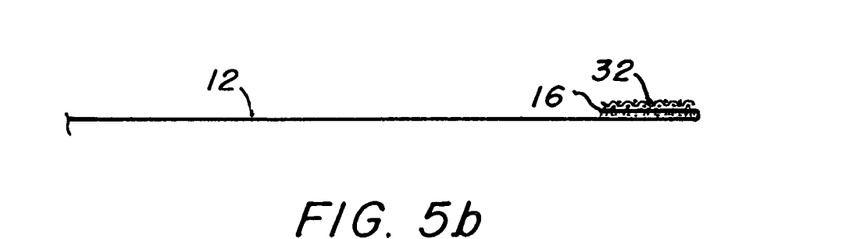
Figure 5C:
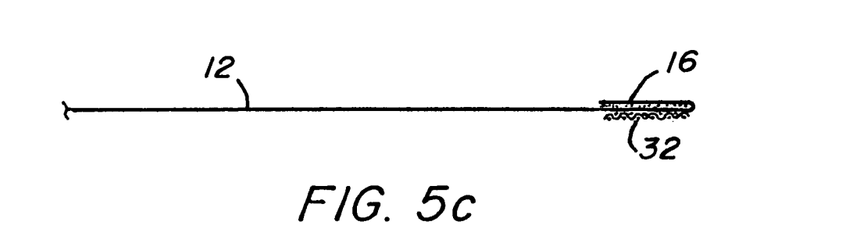

FIG. 4 also is similar in concept to FIG. 2 however it employs two plies and a reinforcing material. The first ply is identified as 24. The reinforcing material as 26 and the top ply as 28. This material is folded back upon itself similarly to the FIG. 2 and FIG. 3 embodiment with overlap section 30 being adhered to the main section of the sheet with any of the means set forth above. Referring to FIGS. 5A-5C, it will be appreciated by one of ordinary skill in the art that a single membrane is reinforced both by using the fold back of FIG. 2 and in addition by having a section of reinforced material 32 added thereto. In FIG. 5A the material 32 is added inside the fold; in FIG. 5B it is added on top of the overlap section 16 and in FIG. 5C it is added under the main section (body portion) 12 directly beneath the overlap section 16 as illustrated. In each of these embodiments attachment may be effected by any of welding (chemical or heat), adhering, sewing, etc.

Figure 6:
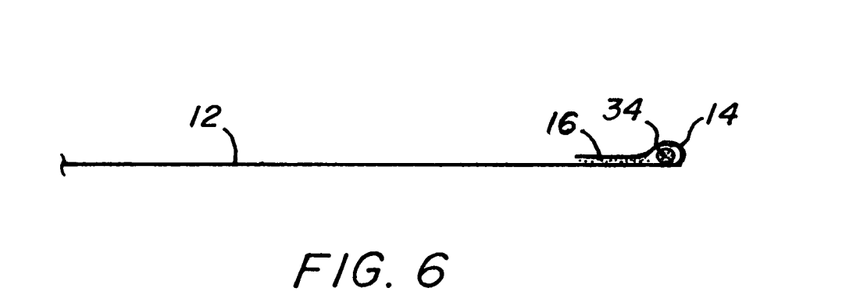
FIG. 6 is the fifth embodiment of a reinforced lap membrane.

Referring to FIG. 6 a single ply membrane is reinforced by being pulled back over on itself similar to that of FIG. 2, however, in the fold area 14 a length of reinforcing material such as rope, cord or the like 34 is added and then the overlap section 16 is adhered to the body section 12 by any of the means above noted.

It should be appreciated in FIG. 6, the reinforcing material is illustrated as somewhat circular in cross-section, that material could also be oval or flat in cross-sections with similar effect.

Figure 7:
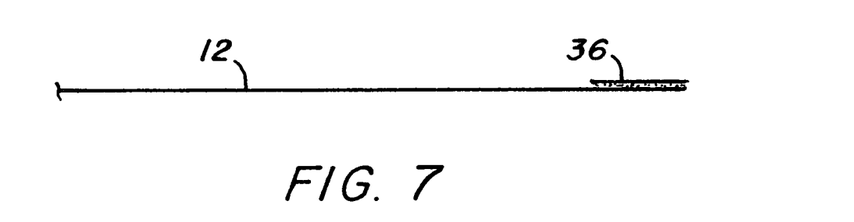
FIG. 7 is the sixth embodiment of a reinforced lap membrane.

Referring now to FIG. 7 an alternate configuration is illustrated utilizing a single ply membrane 12 with a single additional sheet of material 36 attached thereto. The material 36 may be attached by any of the means set forth hereinabove and the constitution of material 36 may be virtually anything not deleterious to the main membrane 12. The material 36 may be identical to the main membrane material 12.

Figure 8:
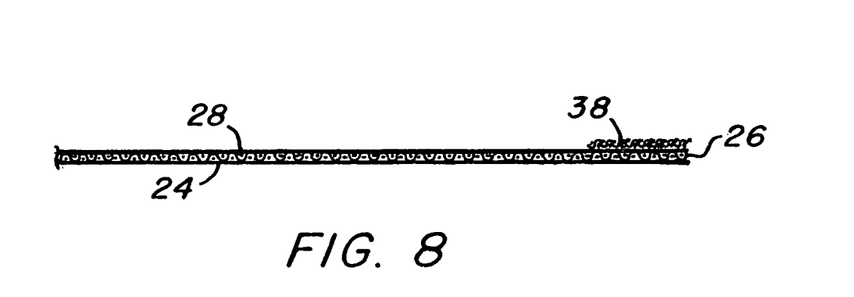
FIG. 8 is the seventh embodiment of a reinforced lap membrane.

FIG. 8 is a schematic illustration of a two ply membrane having a reinforced material therein which is similar to FIG. 4, wherein the first ply is identified as numeral 24, the second ply as numeral 28 and the reinforcing material as numeral 26. A separate sheet of material 38 is added to the membrane and adhered thereto in any of the ways discussed above. It should be noted that the added material here may be any desired by the party making the adhesion. One specific embodiment would include a very strong material to enhance properties of the membrane. The material 38 may also be a piece of reinforcing mesh such as scrim, which may be a polyester weft inserted material commercially available from JPS Glass Fabrics, Slater, S.C., and may be located either on the top surface or the bottom surface of the membrane when used.

Figure 9:
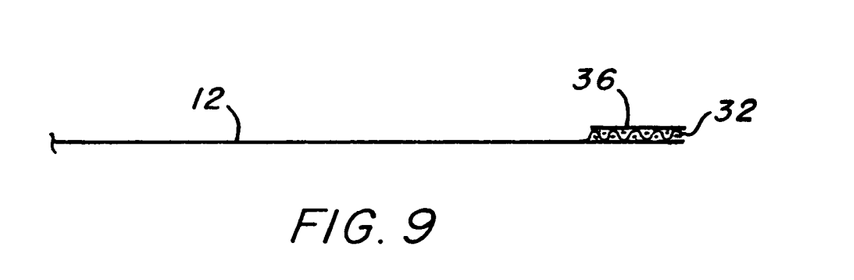
FIG. 9 is the eighth embodiment of a reinforced lap membrane.

FIG. 9 is another embodiment hereof where a single ply membrane 12 is strengthened at an edge thereof by the addition of a piece of reinforcing material 32 and an additional piece of cover material 36 which may be a single ply membrane or any other material desired. These are adhered in the ways set forth hereinabove.

Figure 10:
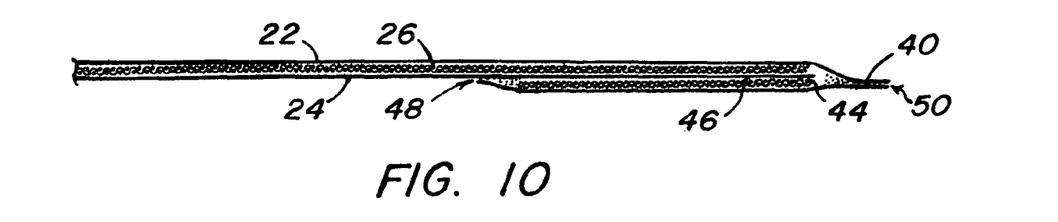
FIG. 10 is the ninth embodiment of a reinforced lap membrane.

Referring to FIG. 10, the sheet 22 is intentionally left longer at the edge 40 than the reinforcing material 26 and second sheet 24 so that an additional reinforcing section of membrane 42 and scrim 44 can be easily adhered and attached at the linear end 46 of the membrane. It will be appreciated that the reinforcement material 44 is shorter than the material 42 on both edges to allow for greater adhesion between material 42 on both edges to allow for greater adhesion between material 42 to material 24 at zone 48 and to material 22 at zone 50. Adhesion between the layers in these zones is effected by welding, gluing, etc.

Figure 11:
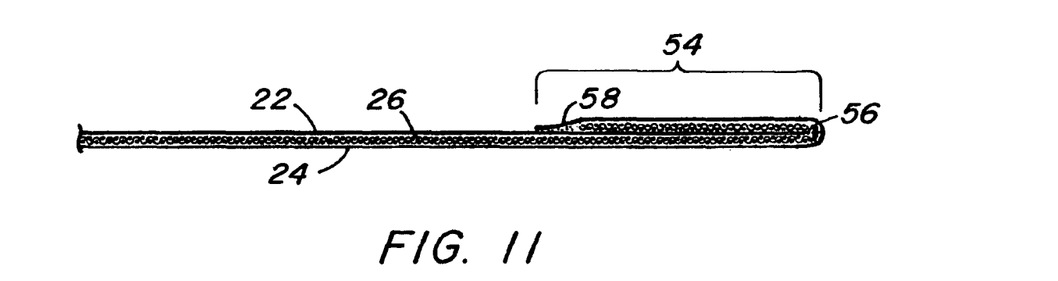
FIG. 11 is the tenth embodiment of a reinforced lap membrane.

In another embodiment, illustrated in FIG. 11, the calendared sheet is left short of material 22 with reinforcing material 26 and material 24 extending beyond an edge 56 of layer 22 for the purpose of being folded over layer 22 as illustrated.

Adhesion of the folded over portion 54 is by heat and compression or adhesive and edge extension 58 is adhered to layer 22 by welding, adhesive, etc.

Figure 12:
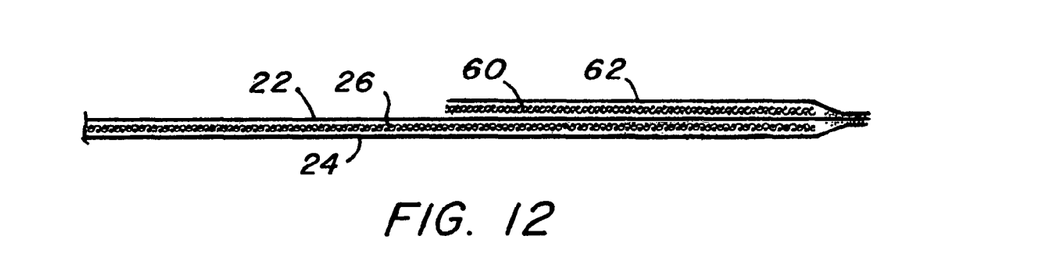
FIG. 12 is the eleventh embodiment of a reinforced lap membrane.

Referring now to FIG. 12, another alternate embodiment is illustrated. In this embodiment layer 22, scrim 26, and layer 24 are essentially the currently commercially available reinforced calendar width membrane. To this is added, at each edge where additional reinforcement is desired, a scrim layer 60 and another ply 62 which are adhered to the membrane 22/24/26.

Figure 13:
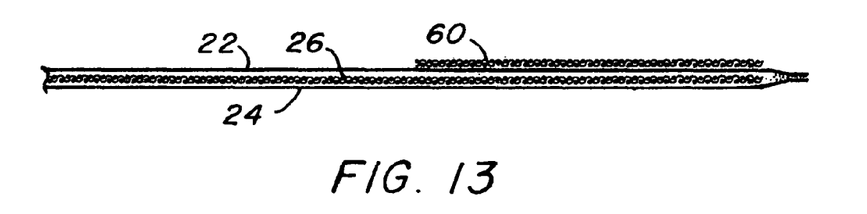
FIG. 13 is the twelfth embodiment of a reinforced lap membrane.
Figure 13A:
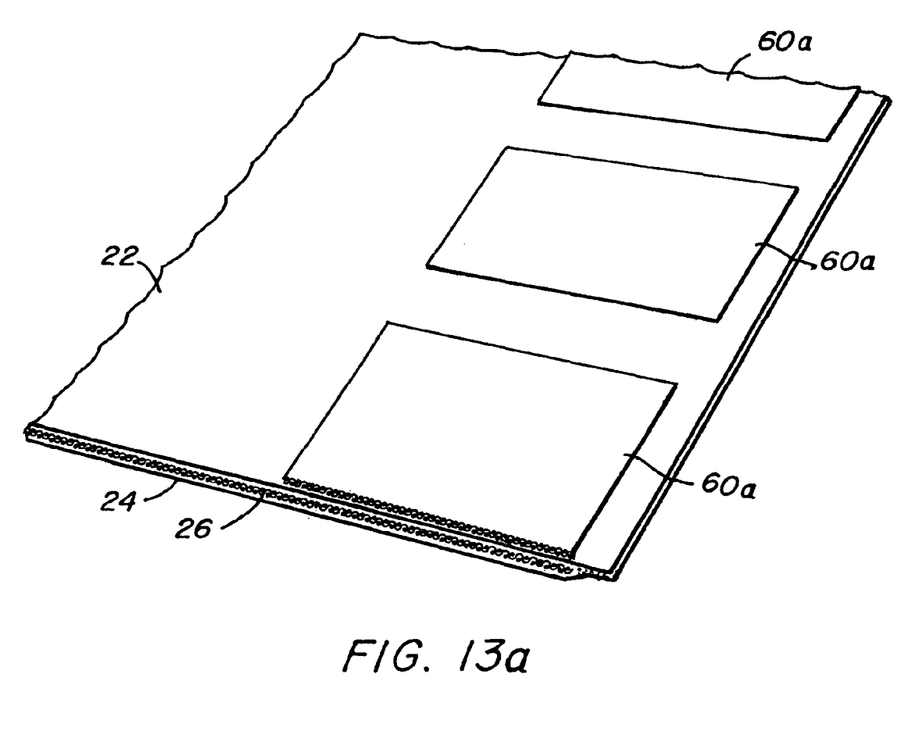
FIG. 13a is another view utilizing the twelfth embodiment to illustrate a patch-type reinforcement.

FIG. 13 is similar to FIG. 12 but omits layer 62. It is noted that the embodiment of FIG. 13 may be constructed during the calendaring operation. FIG. 13a utilizes FIG. 13 to illustrate a patch-type alternative reinforcement embodiment. 60a is intended in this illustration to identify individual patches (pieces). Such patches may be of any geometric shape (such as square or circular pieces) and may be of any number of layers. The placement of patches is dictated by where fasteners are intended to penetrate the material. Therefore, by utilizing the patches, the roofing material is reinforced at precisely the location where it needs to be.

It is also to be pointed out that any of the foregoing or following embodiments may be further enhanced by application of additional discrete layer of material where fasteners are intended to penetrate. Such pieces may have any desired geometric shape.

All of the foregoing embodiments are constructible at any time after calendaring of a base material. The following embodiments are constructible during calendaring.

Figure 14:
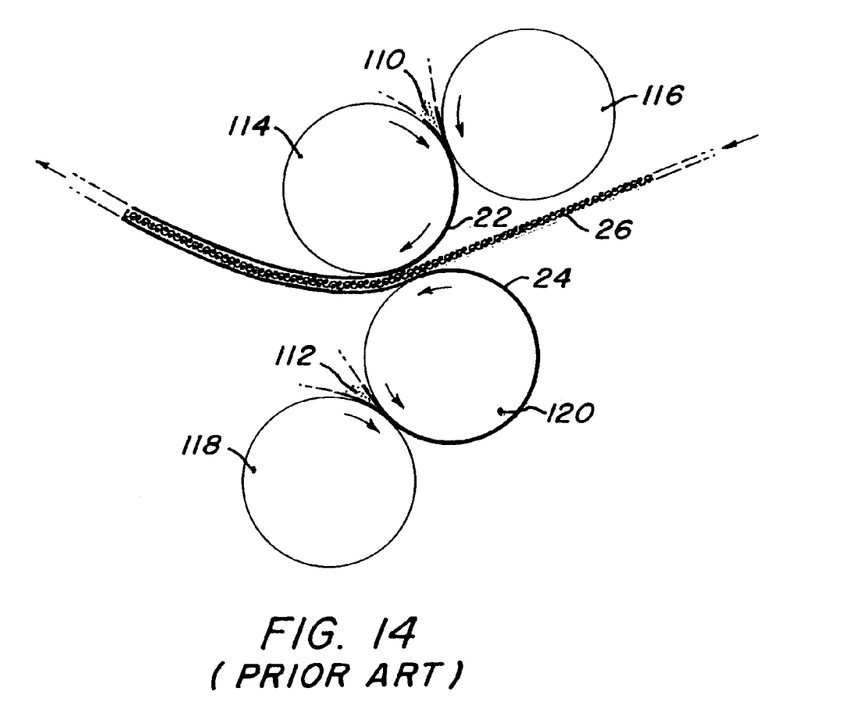
FIG. 14 is a representation of a prior art calendaring device.
Figure 15:
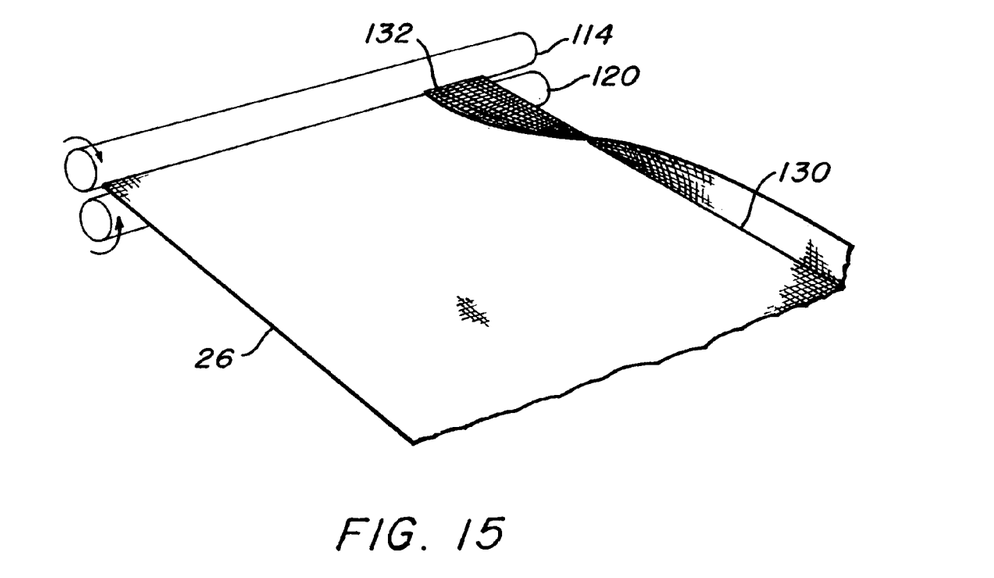
FIG. 15 is the thirteenth embodiment of a reinforced lap membrane.
Figure 16:
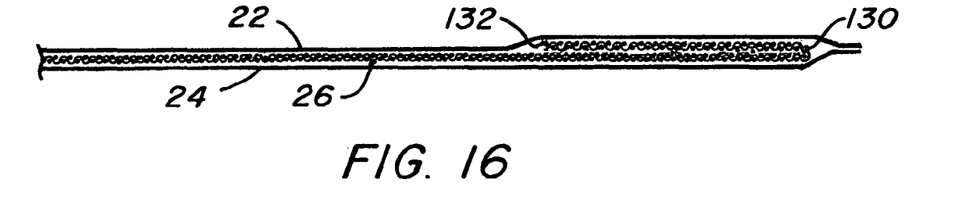
FIG. 16 is the fourteenth embodiment of a reinforced lap membrane.

Referring to FIG. 14, a schematic representation of a calendaring process is illustrated. Bulk material 110 and bulk material 112 are forced through rollers 114/116 and 118/120 respectively to form sheet material 22 and 24 from bulk material 110 and 112, respectively. The sheet material 22 and 24 is then run through rollers 114 and 120 along with a reinforcing material such as a mesh material 26. In one embodiment, the reinforcing material is a polyester weft inserted material, which is commercially available from JPS Glass Fabrics, Slater, S.C. The material is of mesh type and is known vernacularly as scrim. The reinforcing material is located between plies of the final membrane. This is a prior art configuration. As set forth above, the prior art would benefit from additional strength. Therefore the inventors hereof have devised the concept illustrated in FIG. 15 wherein the scrim 26 is folded upon itself at one axial end of the calendar rollers 114 and 120. The scrim 26 is folded at fold line 130 to provide a selected length of overlap 132 such as, but not limited to 4-8 inches of overlap 132. In the overlapped configuration of scrim 26, the calendaring process continues unabated in an otherwise normal way. Scrim 26 becomes permanently embedded in the two plies 22 and 24. This is illustrated in schematic cross-section in FIG. 16. An advantage of this configuration is that the material is ready made to have enhanced strength at the lap edge thereof such that additional adhering of material in the field, as is required in some of the alternate embodiments disclosed herein is not required for this embodiment. It should be noted that although each of the independent embodiments discussed herein focuses upon one edge of the membrane being reinforced, the means by which they are reinforced can be duplicated on the other edge of the calendared sheet. Moreover, with some additional labor, all edges of the sheet may be reinforced in the calendaring process or may be reinforced after the calendaring processes.

Figure 17:
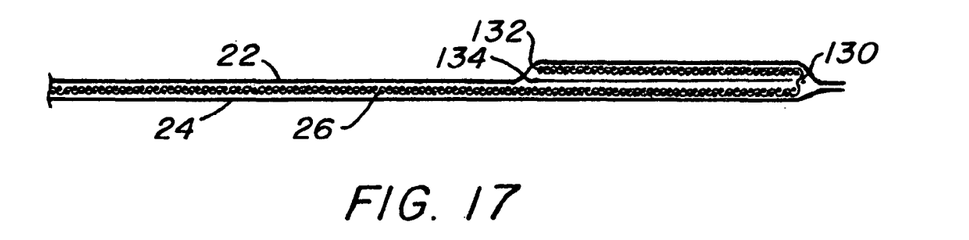
FIG. 17 is the fifteenth embodiment of a reinforced lap membrane.

In another embodiment, a reinforced lap edge is constructible in the calendaring process as illustrated in FIG. 17. In this embodiment, adhesion between the layers of reinforcing material 26 in the overlap area is enhanced by the addition of a thin film 134 of the material 22 or 24. The material of the thin film 134 is to be selected such that it will melt when subjected to the common heat range of commercial calendaring machines.

Figure 18:
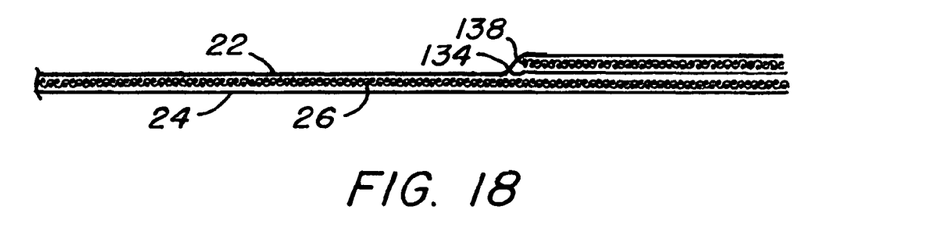
FIG. 18 is the sixteenth embodiment of a reinforced lap membrane.

In yet another embodiment constructible in the calendaring operation, and referring to FIG. 18, the reinforcement material 26 is not folded upon itself but rather a separate piece 138 is placed as illustrated adjacent the standard piece of reinforcement 26. A thin film 134 as in the embodiment of FIG. 5 may, as illustrated, also provided to enhance adhesion between the layers. It will be understood that the extra thin film need not be included.

Figure 19:
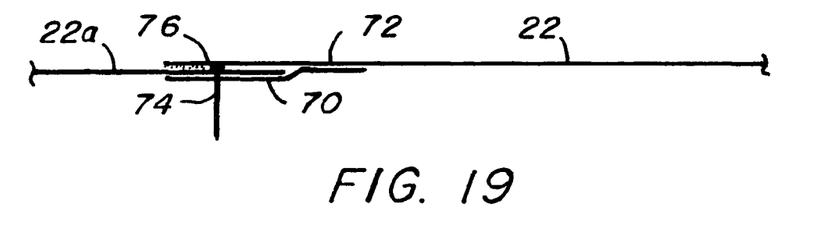
FIG. 19 is the seventeenth embodiment of a reinforced lap membrane.

In FIG. 19 yet another embodiment, material 22 is provided with an under flap 70, which is attached to material 22 by welding, adhesive, etc. at region 72. As illustrated, this material is intended to extend below another segment of material 22a. A fastener 74 is driven through material 22a and under flap 70 into a support structure (not shown). This leaves a flap section 76 of material 22 to extend over fastener 74 and to be adhered by welding, adhesive, etc. to material 22a. By this process the lap edge of the roof material is reinforced and the fastener is covered.

It should also be appreciated that in each of the foregoing embodiments, although reinforcement is illustrated on one edge of a sheet of membrane, the concept hereof includes reinforcement of both of two opposed edges with any of the reinforcing arrangements disclosed in this application and could be on all edges in specific applications.

While preferred embodiments have been shown and described, modifications and substitutions may be made thereto without departing from the spirit and scope of the invention. Accordingly, it is to be understood that the present invention has been described by way of illustrations and not limitation.

It should be appreciated that each body portion and reinforcing material body portion discussed above is foldable upon itself over an entire surface area of the body portion or reinforcing material body portion, wherein the entire surface area of the body portion or reinforcing material body portion includes a rigidity that allows for a folding at any time after calendaring of the body portion or reinforcing material body portion, this folding occurring without altering a structural integrity of the body portion or reinforcing material body portion. In addition, it should be appreciated that each overlap portion discussed above is an of end the body portion or reinforcing material body portion folded back upon itself, wherein the body portion or reinforcing material body portion is of a substantially greater length than the overlap portion or reinforcing material overlap portion in a direction of the overlap.

The invention claimed is:

1. A roofing system comprising:
   an inseam mechanically attached to a roof in the lap type roof installation, said inseam including:
   an overlap consisting of
   a body portion that is foldable upon itself over an entire surface area of said body portion, wherein said entire surface area of said body portion includes a rigidity that allows for a folding at any time after calendaring of said body portion, said folding occurring without altering a structural integrity of said body portion;
   a fold line along the body portion;
   an overlap portion overlying the body portion, wherein said overlap portion is an end of said body portion folded back upon itself, and wherein said body portion is of a substantially greater length than said overlap portion in a direction of said overlap; and
   a adhering means, wherein said body portion and said overlap portion are retained together via said adhering means, and wherein said adhering means is disposed completely between said body portion and said overlap portion;
   a mechanical fastener disposed through said overlap portion and said body portion in a manner that secures said inseam to said roof.

2. A roofing system for an inseam mechanically attached in the lap type roof installation as claimed in claim 1 wherein the body portion is a single ply material.

3. A roofing system for an inseam mechanically attached in the lap type roof installation as claimed in claim 1 wherein the body portion is a multi-ply material.

4. A roofing system for an inseam mechanically attached in the lap type roof installation as claimed in claim 1 wherein the material is reinforced with a reinforcing material.

5. A roofing system for an inseam mechanically attached in the lap type roof installation as claimed in claim 4 wherein the reinforcing material is a reinforcing mesh.

6. A roofing system for an inseam mechanically attached in the lap type roof installation as claimed in claim 4 wherein the reinforcing material is polyester weft inserted material.

7. A roofing system for an inseam mechanically attached in the lap type roof installation as claimed in claim 1 wherein the retention means is welding.

8. A roofing system for an inseam mechanically attached in the lap type roof installation as claimed in claim 7 wherein the welding is heat welding.

9. A roofing system for an inseam mechanically attached in the lap type roof installation as claimed in claim 7 wherein the welding is chemical welding.

10. A roofing system for an inseam mechanically attached in the lap type roof installation as claimed in claim 1 wherein the retention means is adhesive composition.

11. A roofing system comprising
    an inseam mechanically attached to a roof in the a lap type roof installation with a reinforced lap edge, said inseam including:
    an overlap portion consisting of:
    a base portion of the roofing material;
    a second portion of said roofing material,
    a reinforcing material body portion, said reinforcing material body portion being foldable upon itself over an entire surface area of said reinforcing material body portion, wherein said entire surface area of said reinforcing material body portion includes a rigidity that allows for a folding at any time after calendaring of said reinforcing material body portion said folding occurring without altering a structural integrity of said reinforcing material body portion;
    a reinforcing material fold line along the reinforcing material body portion;
    a reinforcing material overlap portion overlying the reinforcing material body portion, wherein said reinforcing material body portion is of a substantially greater length than said reinforcing material overlap portion in a direction of said overlap portion, the reinforcing material body portion and reinforcing material overlap portion being disposed between the base portion and second portion, the reinforcing material overlap portion and the reinforcing material body portion both being of separate construction from both the base portion and the second portion;
    a fastener disposed through said second portion, said reinforcing material overlap portion, said reinforcing material body portion and said base portion in a manner that secures said inseam to said roof.

12. A roofing system for an inseam mechanically attached in the a lap type roof system with a reinforced lap edge as claimed in claim 11 wherein the base portion is a multi-ply reinforced sheet material.

13. A roofing system for an inseam mechanically attached in the lap type roof installation as claimed in claim 11, wherein a film is disposed between the reinforcing material body portion and reinforcing material overlap portion.

14. A roofing system for an inseam mechanically attached in the lap type roof installation as claimed in claim 12, wherein the film is melted into adhesion with both the reinforcing material body portion and reinforcing material overlap portion during a calendaring process.

15. A roofing system comprising
an inseam mechanically attached to a roof in the lap type roof installation said inseam including:
an overlap consisting of
a body portion that is foldable upon itself over an entire surface area of said body portion, wherein said entire surface area of said body portion includes a rigidity that allows for a folding at any time after calendaring of said body portion, said folding occurring without altering a structural integrity of said body portion;
a fold line along the body portion;
an overlap portion overlying the body portion wherein said body portion is of a substantially greater length than said overlap portion in a direction of said overlap;
a single piece of reinforcing material;
a adhering means, wherein said body portion and said overlap portion are retained together via said adhering means, and wherein said adhering means is disposed completely between said body portion and said overlap portion; and
a fastener disposed through said overlap portion and said body portion in a manner that secures said inseam to said roof.

* * * * *